(12) United States Patent
Himmelhuber et al.

(10) Patent No.: US 7,108,328 B2
(45) Date of Patent: Sep. 19, 2006

(54) ARMREST

(75) Inventors: Erwin Himmelhuber, Sulzbach/Rosenberg (DE); Alexander Albu, Neutraubling (DE)

(73) Assignee: Grammar AG, Amberg (DE)

( * ) Notice: Subject to any disclaimer, the term of this patent is extended or adjusted under 35 U.S.C. 154(b) by 81 days.

(21) Appl. No.: 10/493,077

(22) PCT Filed: Aug. 19, 2003

(86) PCT No.: PCT/DE03/02785

§ 371 (c)(1),
(2), (4) Date: Apr. 16, 2004

(87) PCT Pub. No.: WO2004/018253

PCT Pub. Date: Mar. 4, 2004

(65) Prior Publication Data

US 2005/0242649 A1    Nov. 3, 2005

(30) Foreign Application Priority Data

Aug. 19, 2002  (DE) ................................ 102 38 619
Aug. 18, 2003  (DE) ................................ 103 38 413

(51) Int. Cl.
*A47C 7/54* (2006.01)
(52) U.S. Cl. .............. 297/411.38; 297/115; 297/411.32
(58) Field of Classification Search ................ 297/115, 297/373, 411.32, 411.38, 411.35, 411.45, 297/411.39, 411.34, 116, 408, 356; 403/97
See application file for complete search history.

(56) References Cited

U.S. PATENT DOCUMENTS

| | | | |
|---|---|---|---|
| 4,181,357 A * | 1/1980 | Swenson et al. ............ | 297/353 |
| 4,466,664 A * | 8/1984 | Kondou .................. | 297/411.39 |
| 4,889,386 A * | 12/1989 | Kochy et al. ............... | 297/359 |
| 4,969,686 A | 11/1990 | Germain | |
| 6,257,668 B1 * | 7/2001 | Chou et al. ............ | 297/411.32 |
| 6,565,156 B1 * | 5/2003 | Yamashita et al. ..... | 297/354.12 |

FOREIGN PATENT DOCUMENTS

| | | |
|---|---|---|
| DE | 27 14 581 | 10/1978 |
| DE | 295 12 686 | 2/1996 |
| DE | 199 15 469 | 10/2000 |
| DE | 10238621 A1 * | 3/2004 |
| EP | 1 164 051 | 12/2001 |
| JP | 52051624 A * | 4/1977 |

* cited by examiner

*Primary Examiner*—Peter M. Cuomo
*Assistant Examiner*—Joseph Edell
(74) *Attorney, Agent, or Firm*—Andrew Wilford

(57) ABSTRACT

A vehicular arm rest has a fixed axle carrying primary and secondary parts formed with meshing arrays of sawteeth angled to inhibit movement of the arm-rest body in a downward direction between a raised position and the lowered position but permit movement of the arm-rest body in the upward direction between the lowered position to the raised position. A spring braced between an abutment and the secondary part urging the secondary-part teeth into mesh with the primary-part teeth. Cam formations push the secondary part away from the primary part on pivoting of the primary part in the downward direction from the raised position of the arm-rest body toward the lowered position for decoupling the primary-part teeth from the secondary-part teeth and couple the primary-part teeth with the secondary-part teeth and prevent further movement in the downward direction on reaching the lowered position.

19 Claims, 19 Drawing Sheets

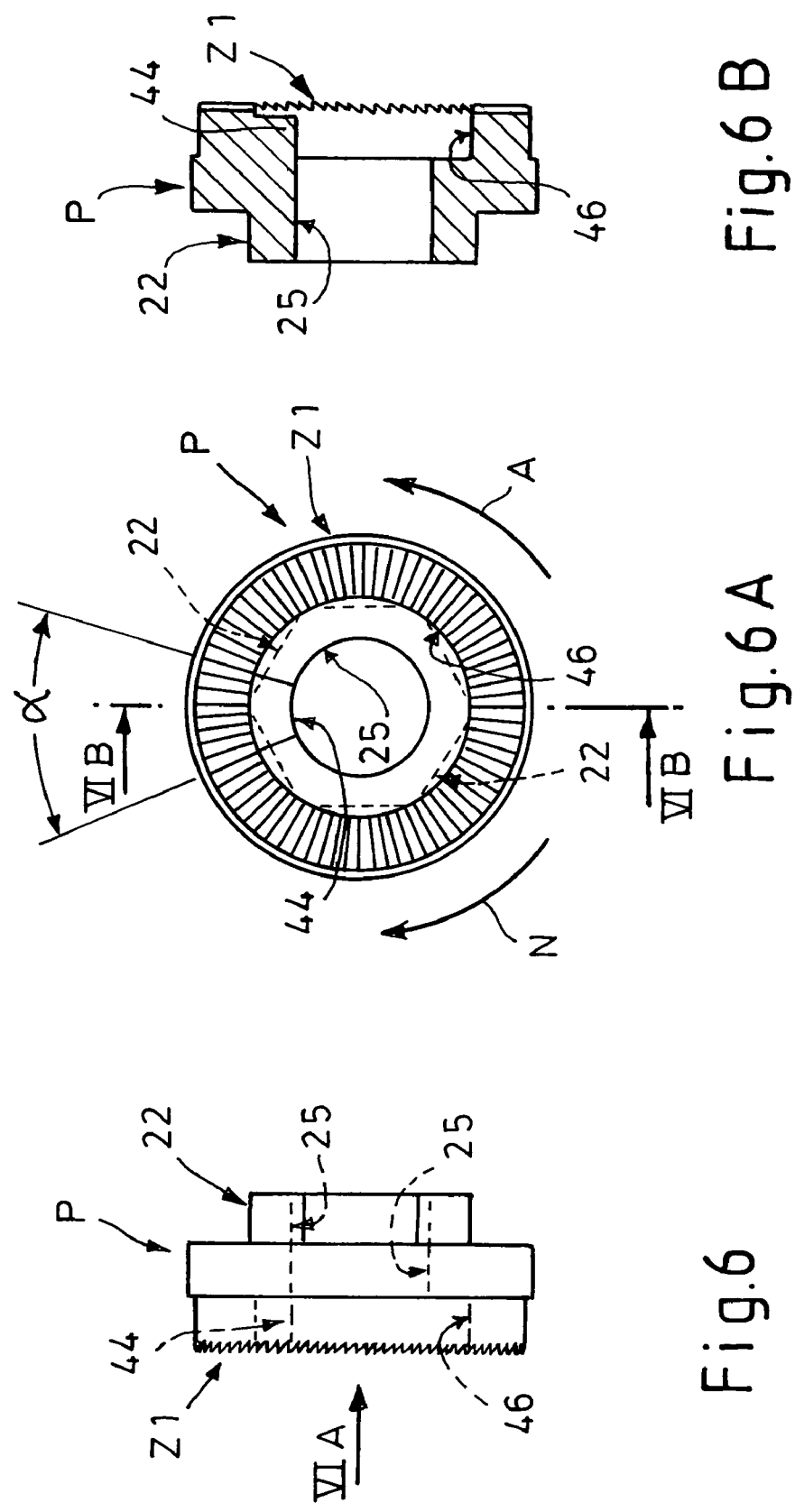

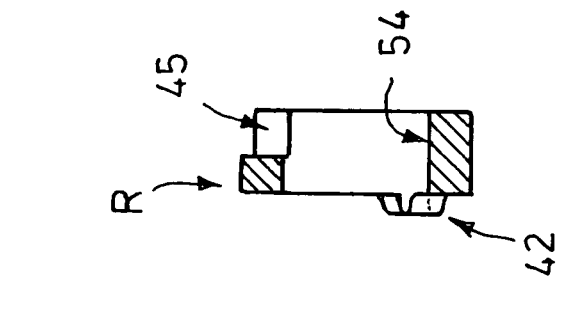
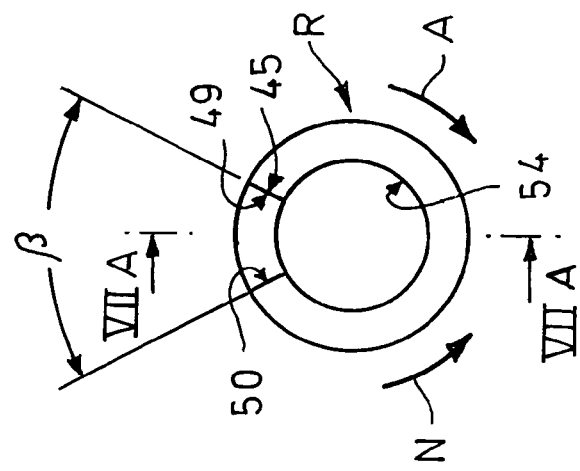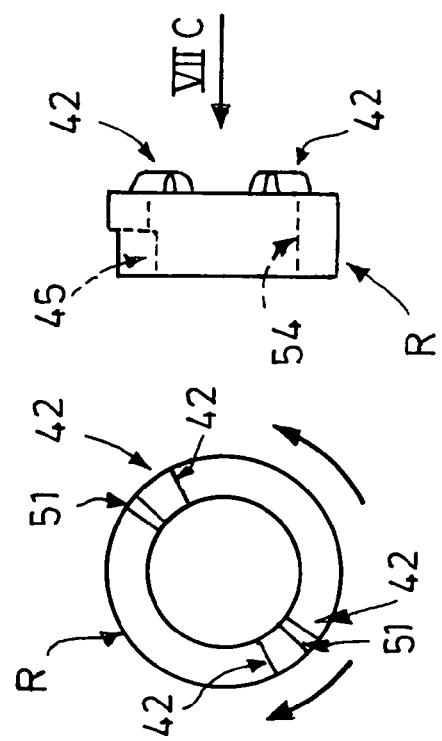

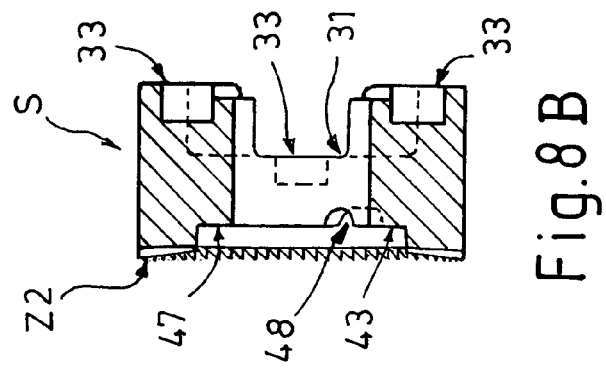
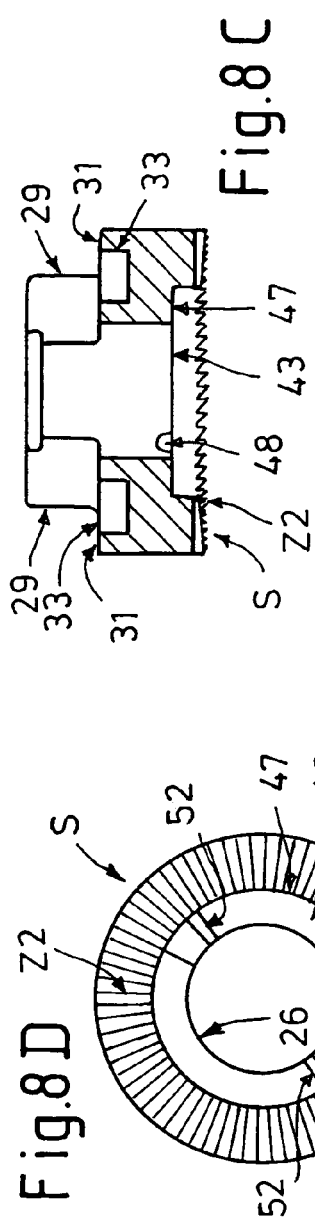
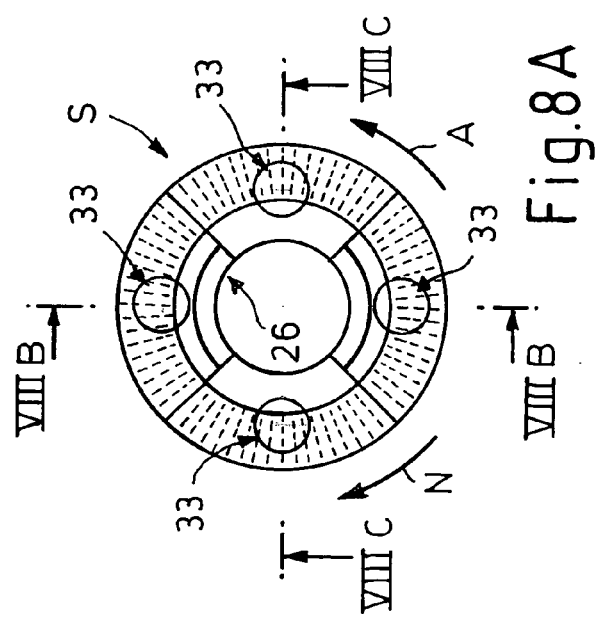
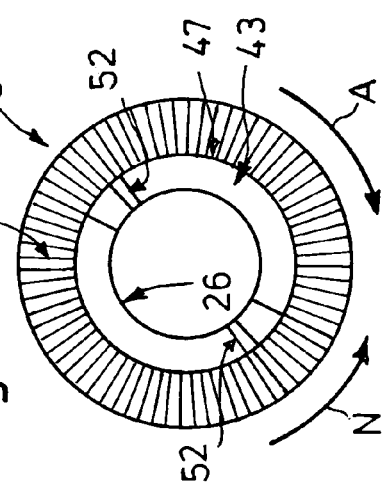
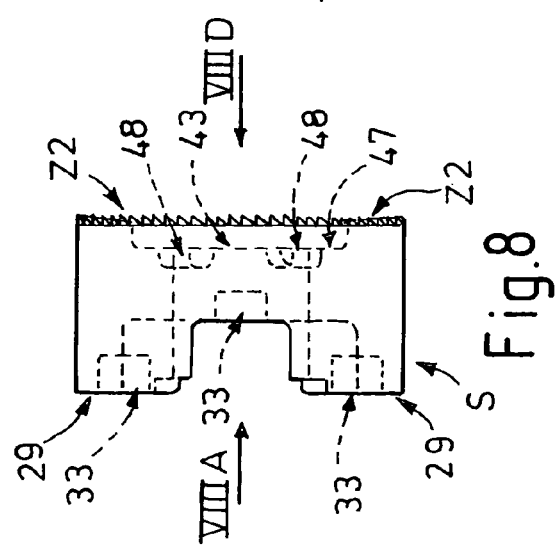

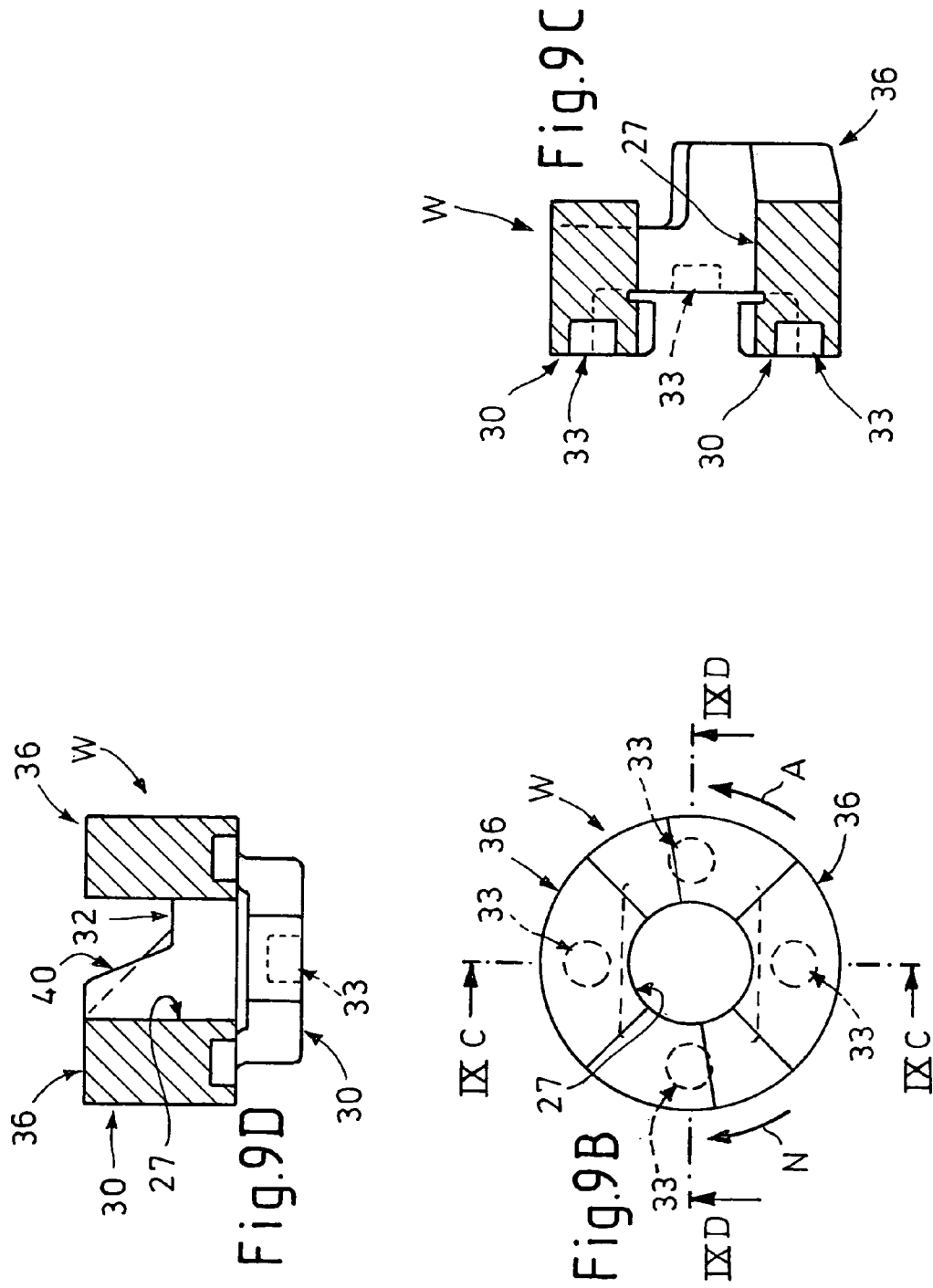

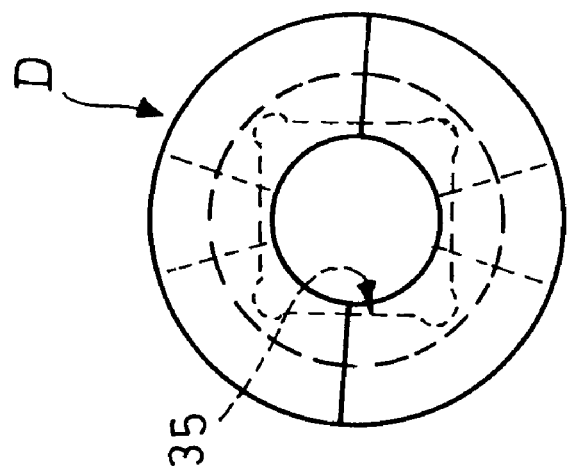
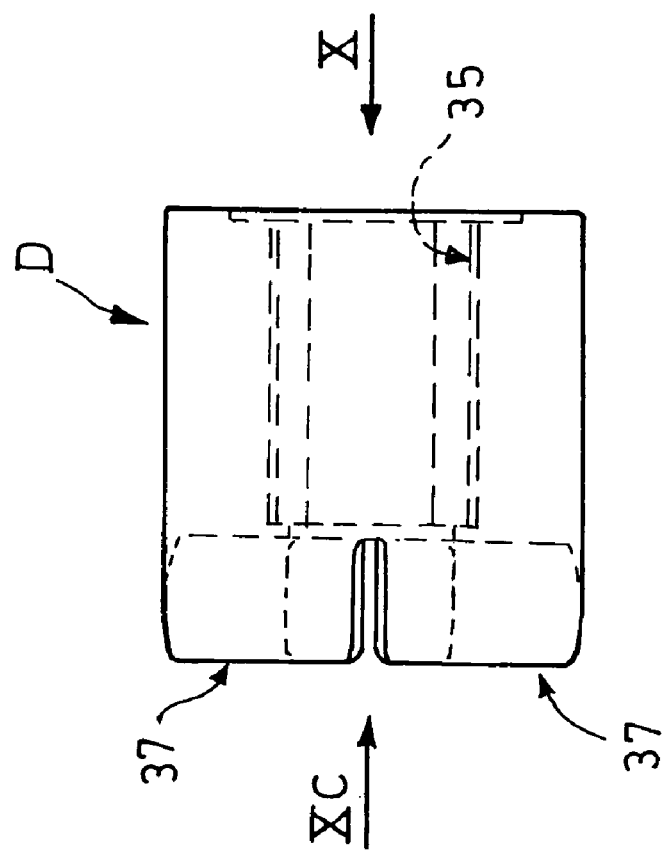
Fig.10C
Fig.10B

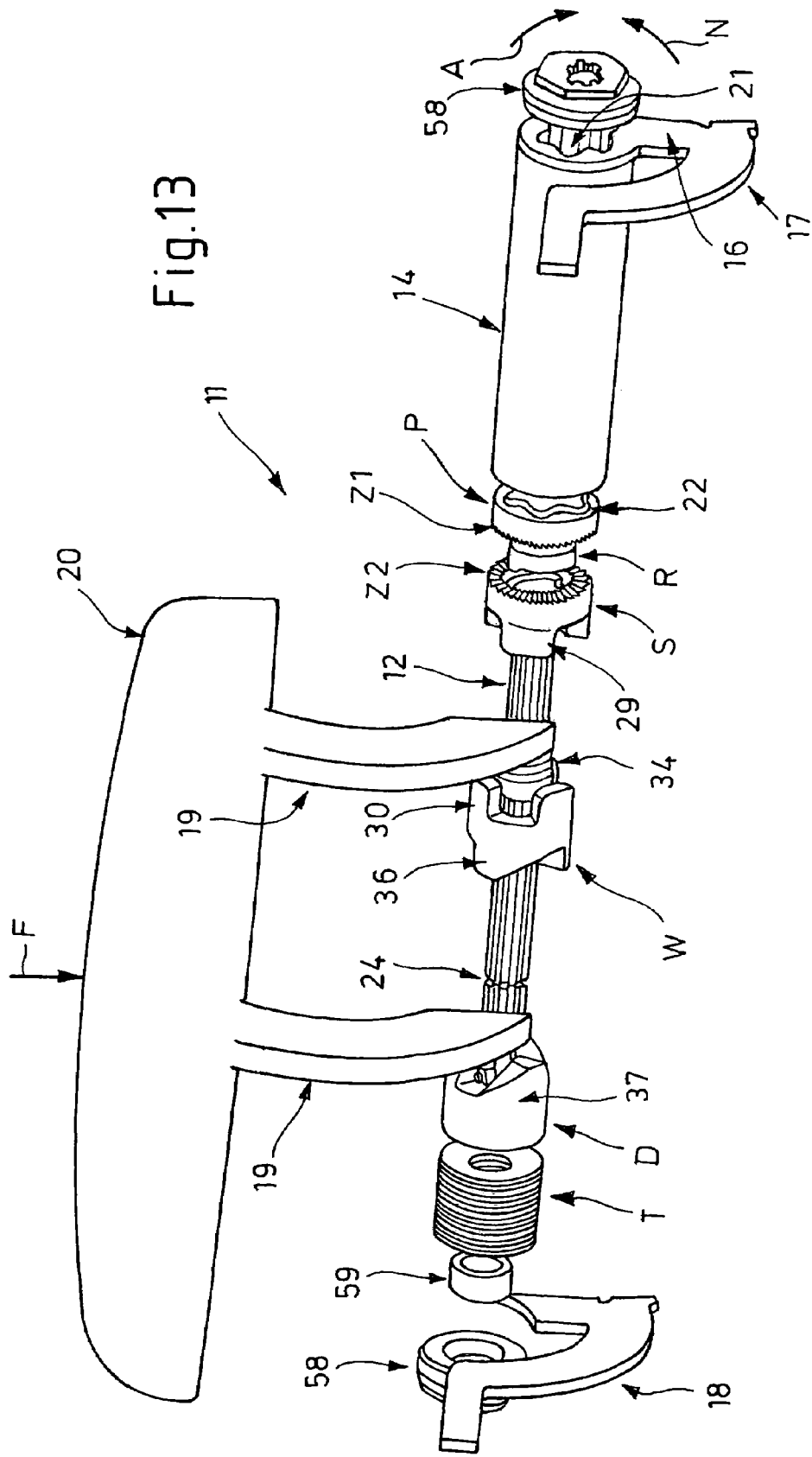

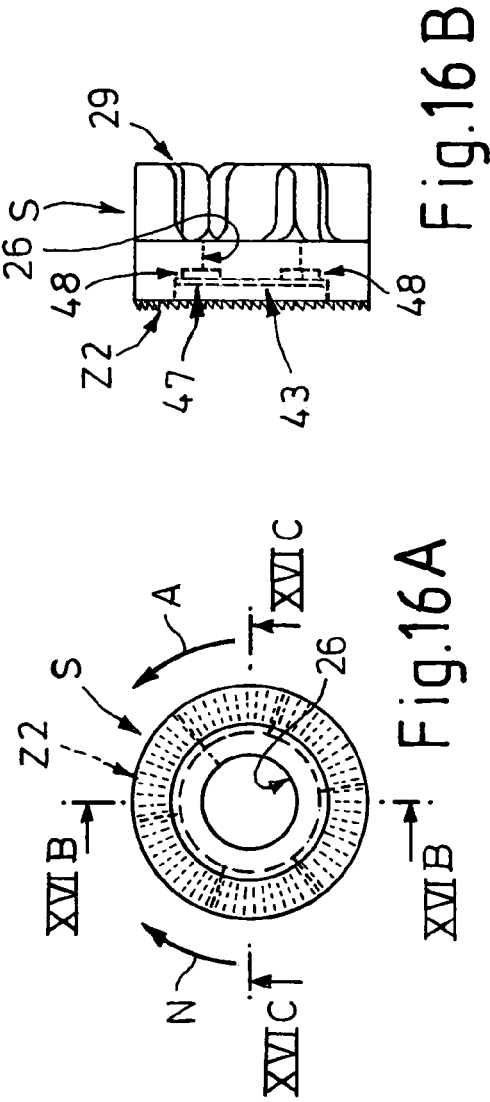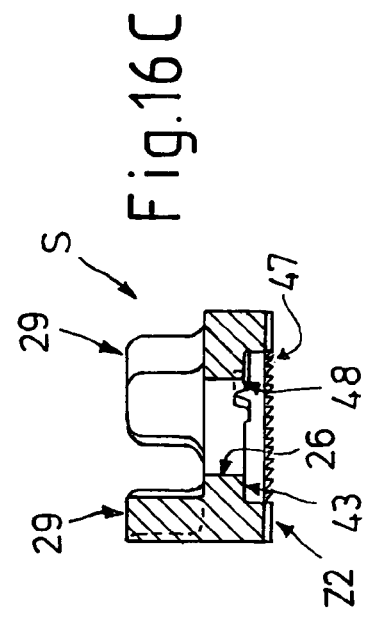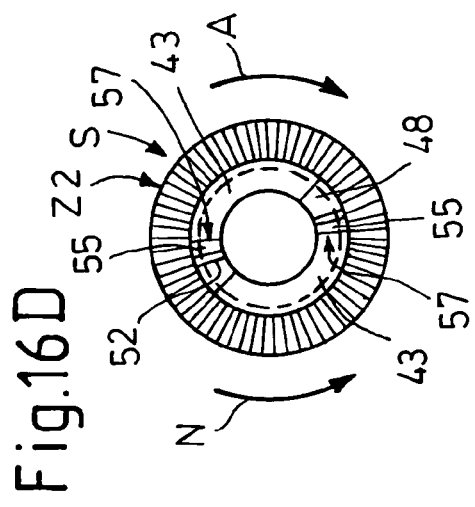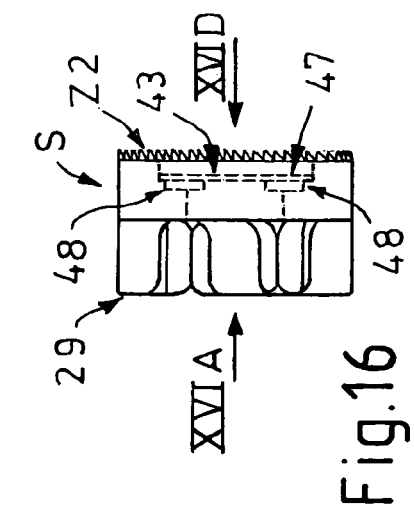

ARMREST

CROSS REFERENCE TO RELATED APPLICATIONS

This application is the U.S. national phase of PCT application PCT/DE2003/002785, filed 19 Aug. 2003, published 4 Mar. 2004 as WO 2004/018253, and claiming the priority of German patent application 10238619.6 itself filed 19 Aug. 2002 and German patent application 10338413.8 itself filed 18 Aug. 2003.

FIELD OF THE INVENTION

The invention relates to an arm rest, for instance a center arm rest having an arm-rest body pivotable about a horizontal axle between a raised and a lowered position and blocked against downward pivoting by a toothed structure that comprises a primary part rotatably mounted on the axle and rotationally coupled to the arm-rest body and a secondary part at least limitedly rotationally fixed on the axle, the toothed structure having a control device that in the raised position and at the start of a downward pivoting of the arm-rest body decouples the primary part and the secondary part from each other and that in the lowered position couples them back together, the primary part and the secondary part having face teeth directed parallel to the axle toward each other like a jaw clutch, the primary or the secondary part being axially movable, the control device coupling and decoupling the primary part and secondary part being formed with at least one cam bump engageable with the primary part or at least one cam track on the primary part and, corresponding thereto, at least one stationary cam track on the secondary part or at least one stationary cam bump on the secondary part, at least one compression spring pressing the teeth of the primary part and secondary part toward each other, an abutment secured against axial movement on the axle limiting axial shifting of the primary part or of the secondary part. Such an arm rest for a motor vehicle is described in EP 1,164,051.

BACKGROUND OF THE INVENTION

The arm rest according to EP 1,164,051 has primary and secondary parts with surfaces centered on a common axis (center axis), confronting each other, and formed like a jaw clutch with face teeth, the primary part mounted on the arm-rest body being pivotal and also axially movable.

The latch teeth of EP 1,164,151 having blocking and sliding flanks like Hirth teeth or a jaw clutch make it possible is with fairly small primary and secondary parts to withstand substantial angular load moments. In addition this known arm rest makes it possible for a control device to determine at what angular positions the primary and secondary parts mesh so that downward pivoting of the arm-rest body is blocked in the selected positions.

The control device for this arm rest is two cam bumps on the primary part. More particularly a control ring between the primary part and secondary part is rotationally coupled to the primary part and carries the two radially projecting cam bumps in diametrally opposite locations. The control ring formed as a separate part can, according to requirements, be better designed, e.g. by being formed integrally with the primary part.

To resist greater torque loads, EP 1,164,051 optimizes the face teeth of the primary part and secondary part in that the teeth of the primary part and of the secondary part are each formed as annularly continuous rings which can therefore be made so big that the outer periphery of the circular area corresponds to the outer periphery of the cross sections of the primary part and/or secondary part with the teeth extending around the entire circumference of the primary part and secondary part. In order to block downward movement of the arm-rest arm, all the teeth, that is a multiplicity of teeth, mesh.

The dependence of the control ring on the pivotal movement of the arm-rest body in the known arrangement is eliminated over a small angle in that the primary part has two circular-segmental slots open in its plane toward the secondary part in each of which a cam bump projecting from the control ring toward the primary part engages and which cooperate with a stationary cam track of the secondary element. In this manner each cam bump of the control ring is of a smaller angular dimension than the respective slot of the primary part. As a result of the different angular dimensions of the slots (large) and cam bump (small) the primary part both in the lowered position and at the start of upward pivoting as well as in the raised position and at the start of downward pivoting of the arm-rest body has some play before engagement of the cam bumps with the first or second end faces of the respective slots.

In EP 1,165,051 a compression spring coaxial with the secondary part and primary part presses the primary part fixed on the arm-rest body axially against the secondary part. The axial shiftability of the primary part is limited by a plate-shaped abutment fixed on the common central axle. Thus the compression spring is effective via a particular pressure-distributing plate on the tooth-free outer end of the primary part which creates a relatively bulky and expensive construction.

In the arm rest according to EP 1,164,501 there is also the disadvantage that with a small upward adjustment of the arm-rest body which is coupled to the axially movable primary part creates a small axial movement of the arm-rest body which can be a problem in close quarters.

In order to prevent damage to such an arm rest the maximum load should not exceed for example 80 daN. It is even preferable to provide a margin of safety and to set up the arm rest with an overload protector that responds at about 30 daN, that for example decouples the toothed structure so that when the load limit is exceeded the arm-rest body can be deflected downward to a position determined by a vehicle-body abutment. Such an overload protector is generally described for example in German 2,714,581.

OBJECT OF THE INVENTION

It is an object of the invention to, starting with the above-described arm rest according to EP 1,164,051, so to improve on the known arm rest that it can withstand a greater load, takes up less space, and has a longer service life.

SUMMARY OF THE INVENTION

This object is achieved in that the primary part is axially fixed on the axle and the secondary part is axially shiftable on the axle, that the teeth of the secondary part are directed axially away from the abutment, and that at least one compression spring is provided between the secondary part and the abutment.

According to the invention the primary part is axially fixed on the axle. Fixing the primary part on the arm-rest body ensures that the arm-rest body when pivoted upwardly will not move axially so that the arm rest according to the invention can be used comfortably even in relatively close quarters.

Also according to the invention the abutment is provided to the end of the secondary part opposite its teeth and at least one compression spring is provided between the secondary part and the abutment. In this manner, namely by bracing the spring directly between the axially movable secondary part and the axially fixed primary part, the invention avoids the bulky and expensive construction of EP 1,164,051 which requires a pressure-distributing plate not needed by the invention.

In addition the control ring can be mounted in a particularly compact manner in the space between the primary part and the secondary part in generally cylindrical recesses that are open toward each other and that together hold the control ring.

Finally the invention proposes that an overload protector is formed as a spring-loaded abutment bearing on the secondary part so that downward pivoting from the lowered position is possible.

In particular a pusher is rotationally fixed but axially shiftable on the axle on a side of the abutment turned away from the secondary part and is biased by a spring force against the abutment. Furthermore coupling-claw projections of the abutment and of the pusher have axially and radially extending flanks that bear on each other on upward pivoting and slide flanks that extend at an angle to the axle and that bear on each other on downward pivoting.

In this case a force of about for example 30 daN is exerted downward on the arm-rest body and is converted into a torque effective through the primary and secondary parts to the fixed abutment on the axle, the angled slide flanks of the coupling-claw projections of the abutment pressing angularly against the angled slide flanks of the coupling-claw projections of is the pusher. The result is that the pusher, which is axially shiftable but rotationally fixed on the axle, can move against the force of for example a spring-washer pack away from the abutment.

This works such that the coupling-claw projections of the abutment can move with their angled slide flanks over the coupling-claw projections and shift the pusher axially while the secondary part can in this manner move out of the way.

According to a further embodiment of the invention the axle is splined along its entire length, the primary part, the control ring, the secondary part, and the abutment each having a smooth central bore through which the axle extends and which allows free rotation, the pusher at least having a central bore complementary to and rotationally coupling it to the axle.

In order to avoid the central axle being a relatively expensive part, according to the invention a shaft is used having full-length splines. Such a splined shaft are standard items sold by length. Such a splined shaft has the advantage that the primary part, the control ring, the secondary part, and the abutment can each be mounted rotatably by a smooth central throughgoing bore on the splined shaft. In case on the contrary something needs to be angularly coupled to the axle, as for example a pusher described more fully below, this part can be provided with a central throughgoing bore complementary to the splined shaft.

The spline shaft also makes it possible for something to slide if necessary axially along the axle, both the elements carried thereon with smooth throughgoing bores and a part with a complementarily shaped bore, e.g. the pusher. In case one of these elements, be it one with a smooth central throughgoing bore or one with a splined central bore, needs to be axially fixed on the shaft, according the invention the axle is provided with at least one recess on its outer surface, as e.g. an annular groove for holding an annular retaining element, e.g. a snap ring.

A further substantial advantage of the present invention is the result of the features according to which in the lifting direction each cam bump after leaving the respective cam recess and riding onto the respective flat cam track engages a ridge formed as a control bump projecting axially toward the control ring and against which the cam bump engages on downward pivoting.

The control bump ensures that on downward pivoting of the arm rest which entails downward pivoting of the primary part fixed to the arm rest, the cam bump of the control ring comes up against the control bump and is momentarily stopped. This ensures that the cam bump of the primary part rotates inside the dam recess relative to the control ring so that it can travel through the play of e.g. 15° necessary for later adjustment.

It is particularly advantages according to this last-described feature when further according to the invention the control bump is immediately adjacent the respective control recess. This means that the cam bump of the control ring after substantial lifting of the arm rest through more than 15° must only get over the control bump so that on a subsequent downward movement the play of about 15° is taken up.

BRIEF DESCRIPTION OF THE DRAWING

The drawing shows preferred embodiments, that is a first embodiment (FIGS. 1–10C) and a second embodiment (FIGS. 11–17A), therein:

FIG. 6 is a side view of the primary part of FIGS. 2 and 3;

FIG. 6A is an end view taken in the direction of arrow VIA of FIG. 6;

FIG. 6b is a sectional view taken along plane VIB—VIB of FIG. 6A;

FIG. 7 is an end view of a control ring;

FIG. 7A is a radial cross section taken along line VIIA—VIIA of FIG. 7, with FIG. 7A corresponding to the FIG. 3 embodiment;

FIG. 7B is a side view of control ring in a position offset to that of FIG. 7A by 180°;

FIG. 7C is an end view taken in the direction of arrow VIIC of FIG. 7B;

FIG. 8 is a side view of a secondary part of the embodiment of FIG. 3;

FIG. 8A is an end view taken in the direction of arrow VIIIA of FIG. 8;

FIG. 8B is an axial section taken along line VIIIB—VIIIB of FIG. 8A;

FIG. 8C is a section offset by 90° from that of FIG. 8b and taken along line VIIIC—VIIIC of FIG. 8A;

FIG. 8D is an end view taken in the direction of arrow VIIID of FIG. 8;

FIG. 9B is an end view taken in the direction of arrow IXB of FIG. 9;

FIG. 9C is an axial section taken along line IXC—IXC of FIG. 9B;

FIG. 9D is an axial section offset by 90° from that of FIG. 9C and taken along line IXD—IXD of FIG. 9B;

FIG. 10B is a side view taken in the direction of arrow XB of FIG. 10;

FIG. 10C is an end view taken in the direction of arrow XC of FIG. 10B;

FIG. 13 is an exploded view with a schematically illustrated arm-rest support;

FIG. 16 is a side view of the secondary part of the embodiment of FIGS. 12 and 13;

FIG. 16A is an end view taken in the direction of arrow XVIA of FIG. 16;

FIG. 16B is an axial section taken along line XVIB—XVIB of FIG. 16A;

FIG. 16C is an axial section in a position offset by 90° to that of FIG. 16B and taken along section line XVIC—XVIC of FIG. 16A;

FIG. 16D is an end view taken in the direction of arrow XVID of FIG. 16;

SPECIFIC DESCRIPTION

Figure 1:
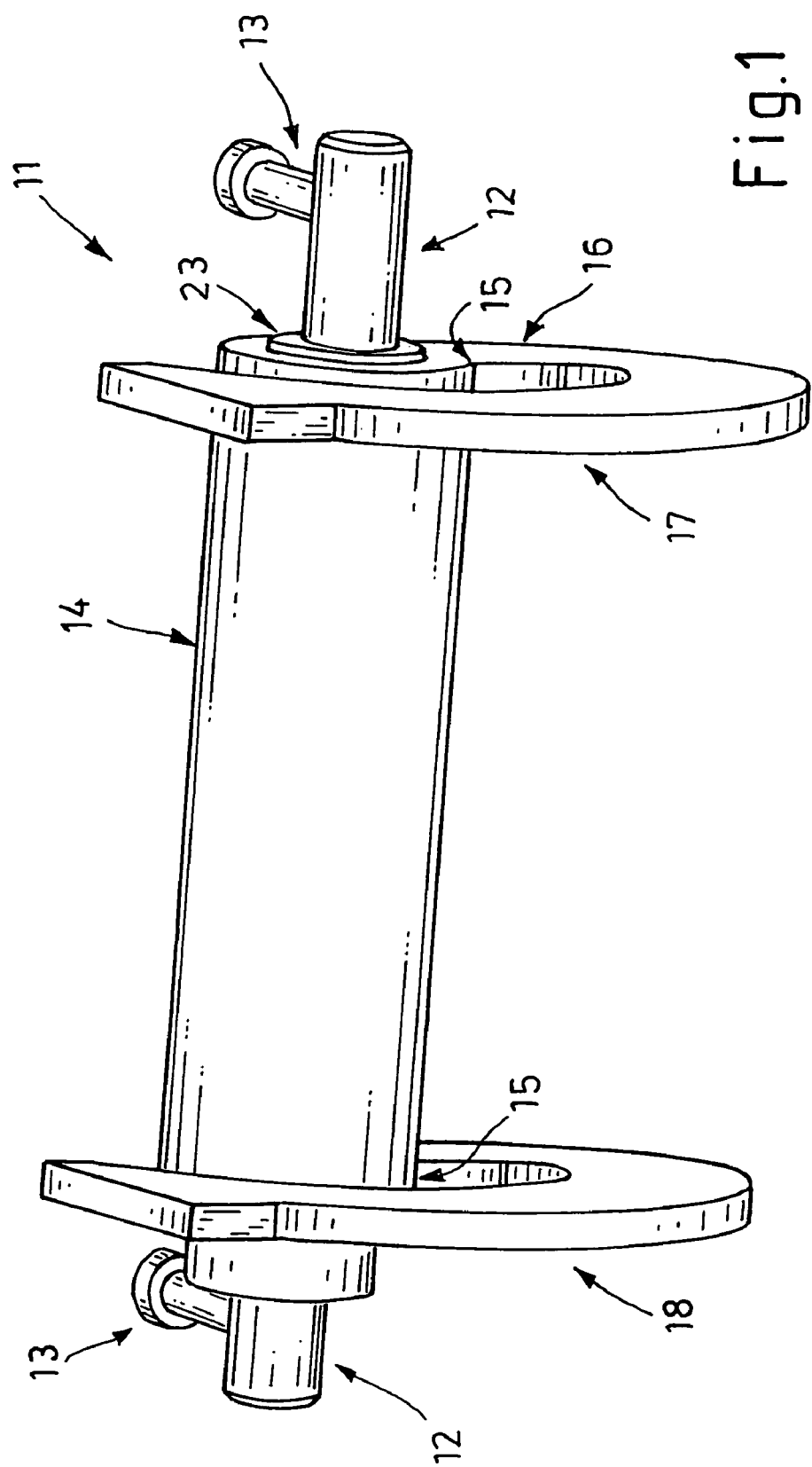
FIG. 1 is a three-dimensional representation of the mechanical elements of an arm rest.
Figure 2:
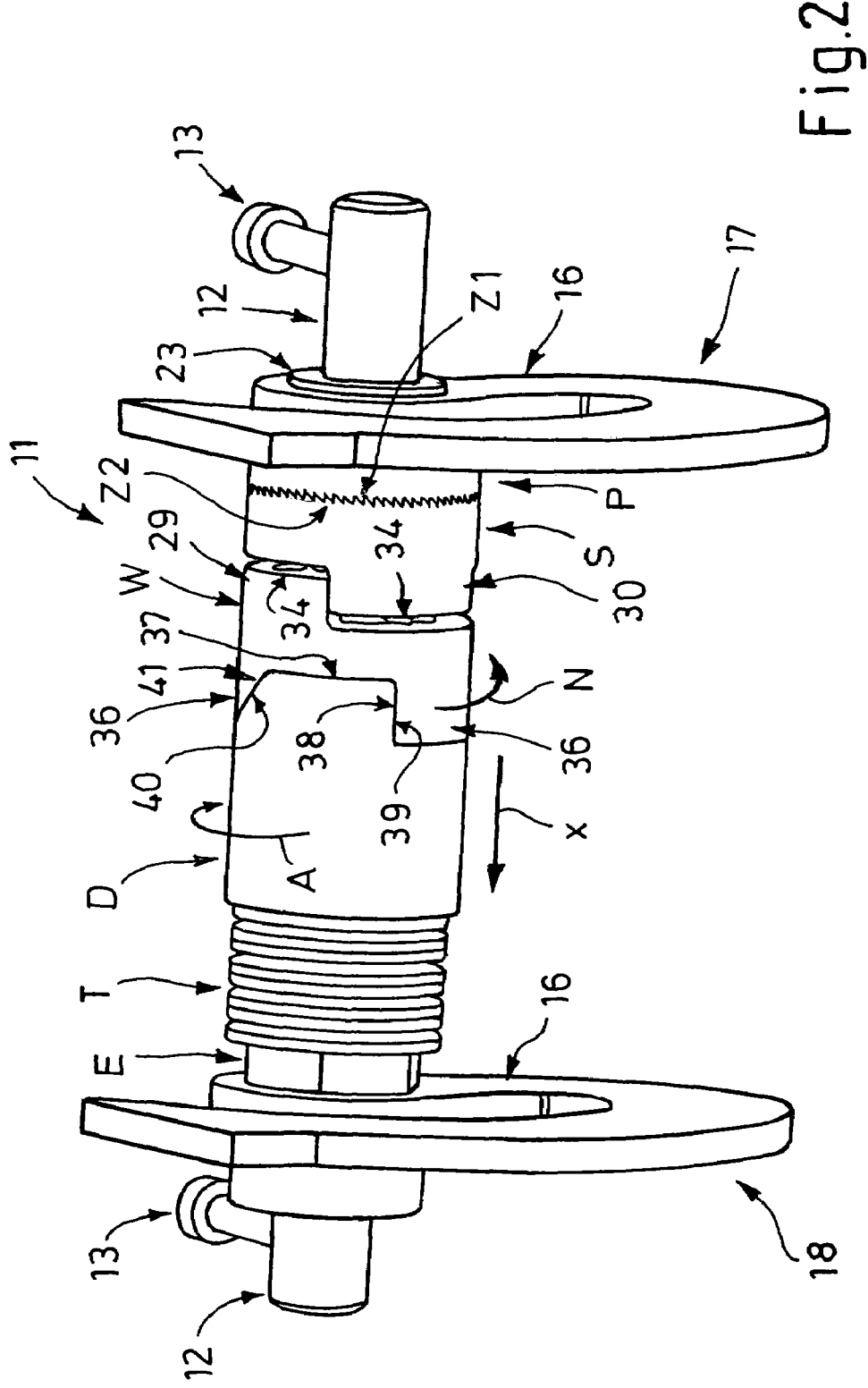
FIG. 2 shows the elements of FIG. 1 without the outer tube shielding the inner parts.

In the following, in spite of structural differences, the same reference numerals are applied to analogous elements in both the embodiment of FIGS. 1–10C and the embodiment of FIGS. 11–17A.

The arm rest is shown in general (see FIGS. 3 and 13) at 10.

The support element of the mechanism 11 of the arm rest 10 is a stationary axle 12 fixed by mounts 13 to an unillustrated vehicle body. The axle 12 has in the embodiment of FIGS. 11–17A a corrugated profile, that is external splines.

Much of the mechanism 11 is surrounded by an outer shield tube 14 having at each end a shoulder 15 bearing on a straight inner end portion 16 of a respective arcuate arm-rest support arm 17 or 18. In this manner the support arm 17 shown in FIGS. 1–4 and FIGS. 11 and 13 on the right and in FIG. 5 on the left is rotationally fixed to the support arm 18 shown on the left in FIGS. 1–4 and FIGS. 11 and 13 and in FIG. 5 on the right.

Two generally U-shaped hollow arms 19 extend from an arm-rest support 20 and are connected in an unillustrated manner with the two support arms 17 and 18.

Since forces F against the arm-rest support 20 are mainly transmitted by the arm 17 into the mechanism 11, the arm 17 in the following is referred to generally as the "arm-rest body" or "pivotal arm-rest body."

Figure 3:
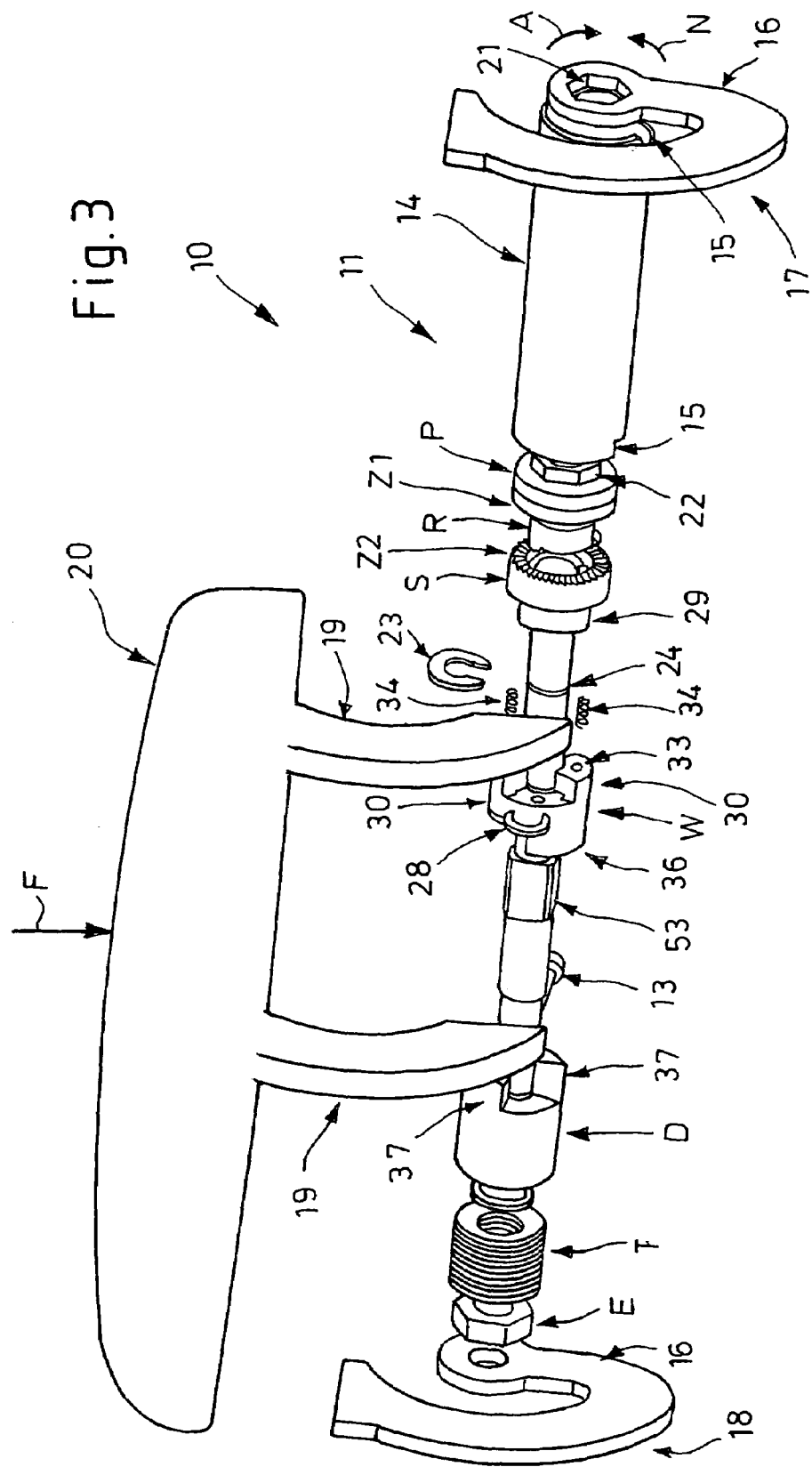
FIGS. 3 and 4 are exploded views of the structure of FIG. 2 with a schematically illustrated arm support seen from two different angles.
Figure 4:
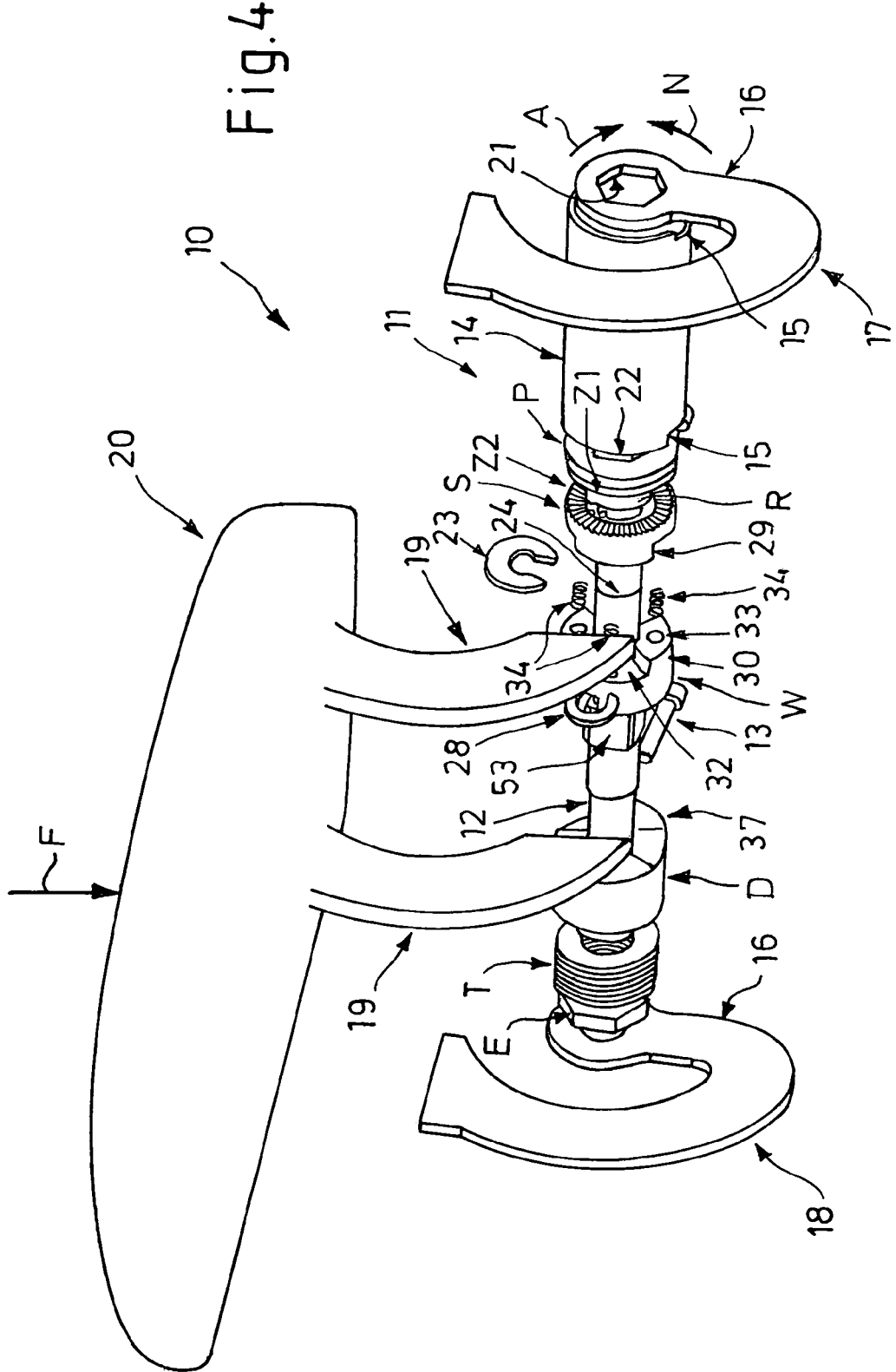
Figure 5:
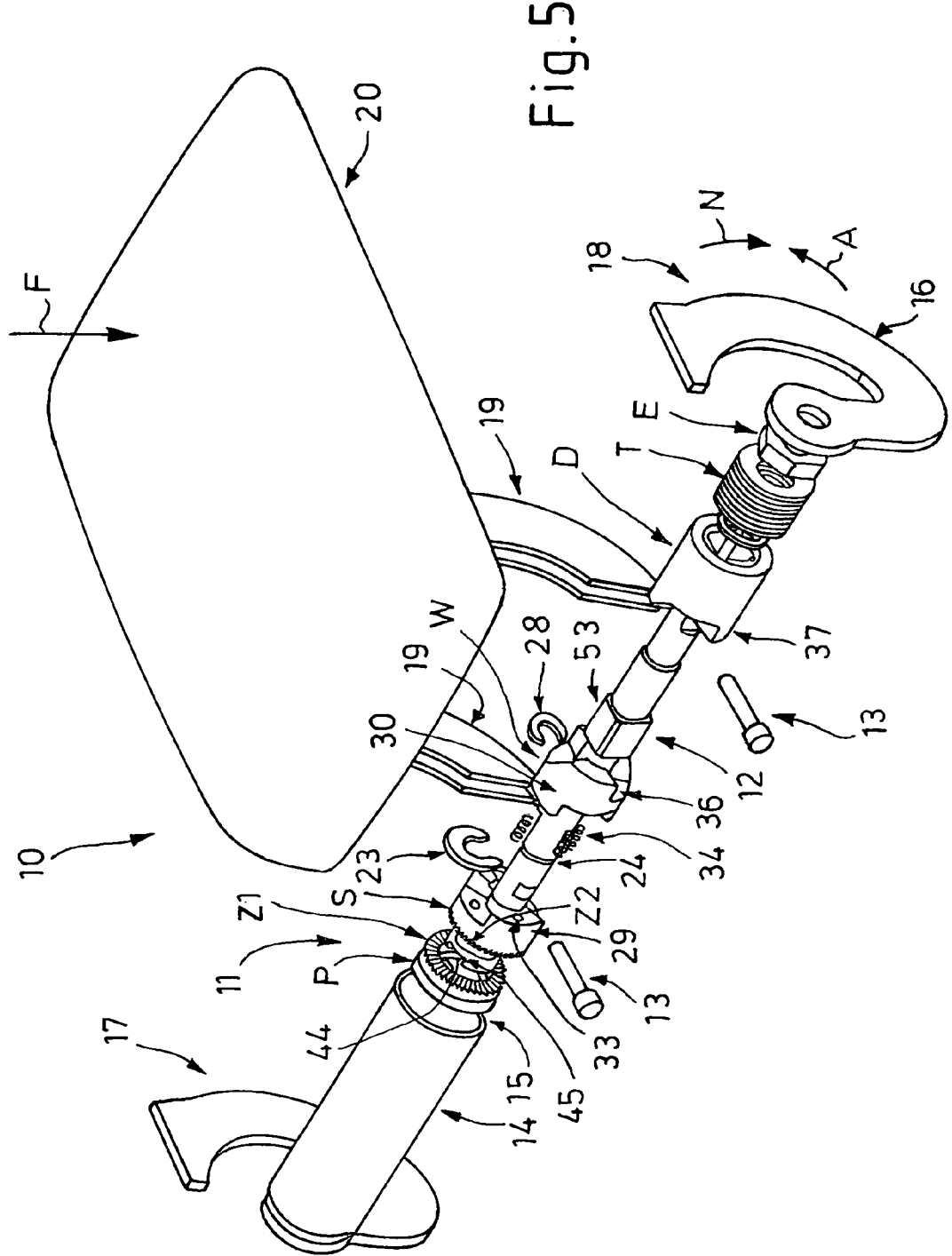
FIG. 5 is a view like FIG. 3 but seen at an 180° opposite angle.
Figure 9:
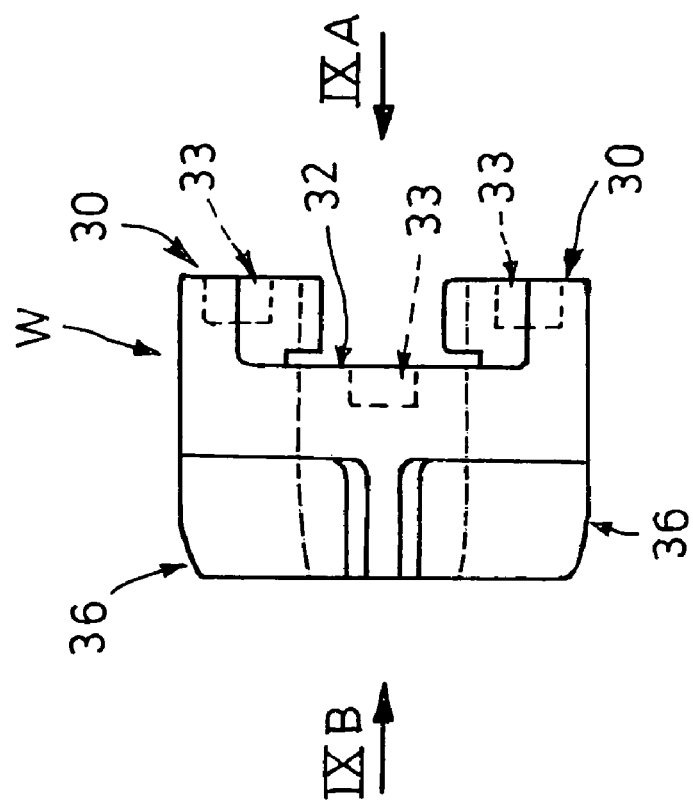
FIG. 9 is a side view of an abutment part according to the embodiment of FIG. 3.
Figure 9A:
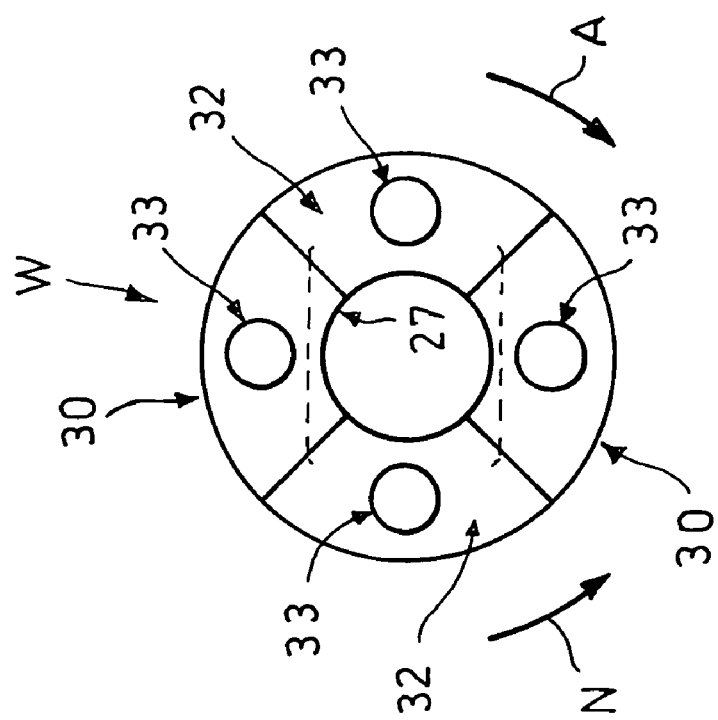
FIG. 9A is an end view taken in the direction of arrow IXA of FIG. 9.
Figure 10:
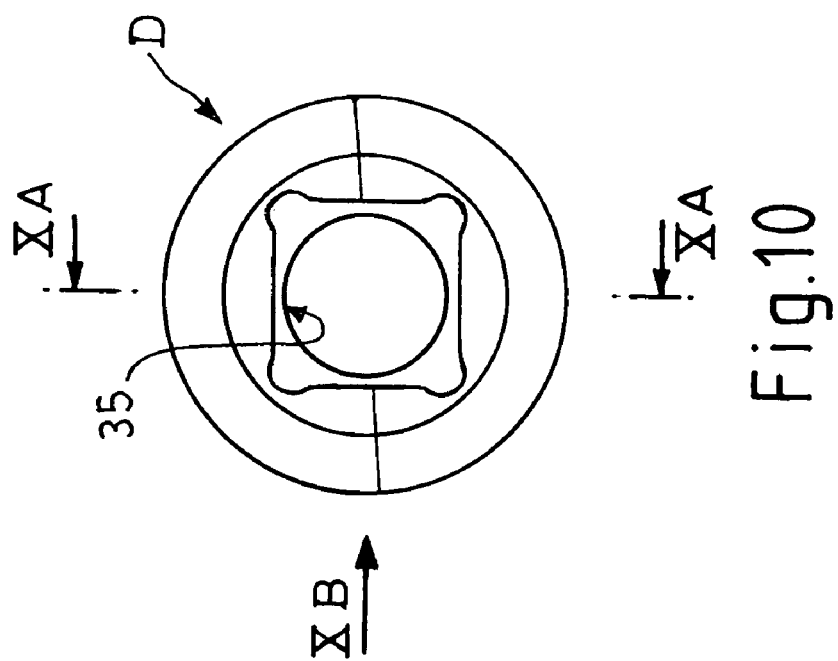
FIG. 10 is an end view of a pusher part, taken in the direction of arrow X of FIG. 10B.
Figure 10A:
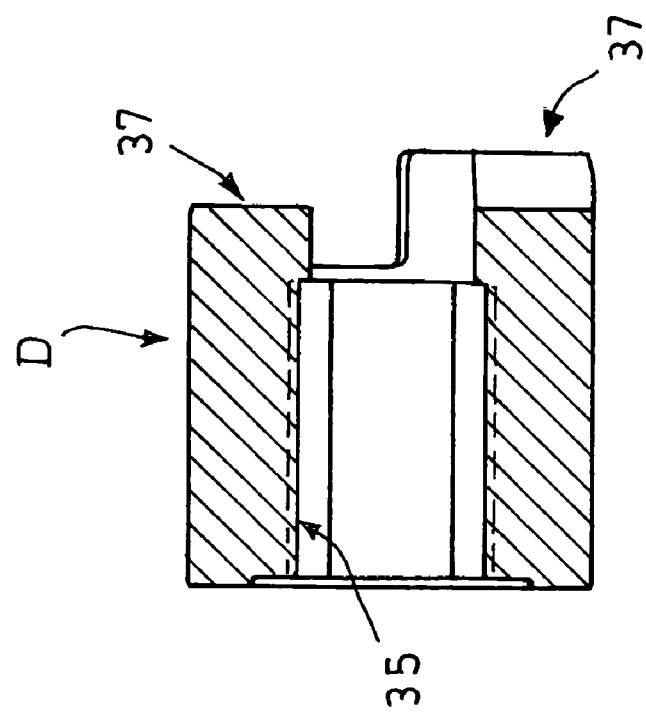
FIG. 10A is an axial section taken along line XA—XA of FIG. 10.
Figure 11:
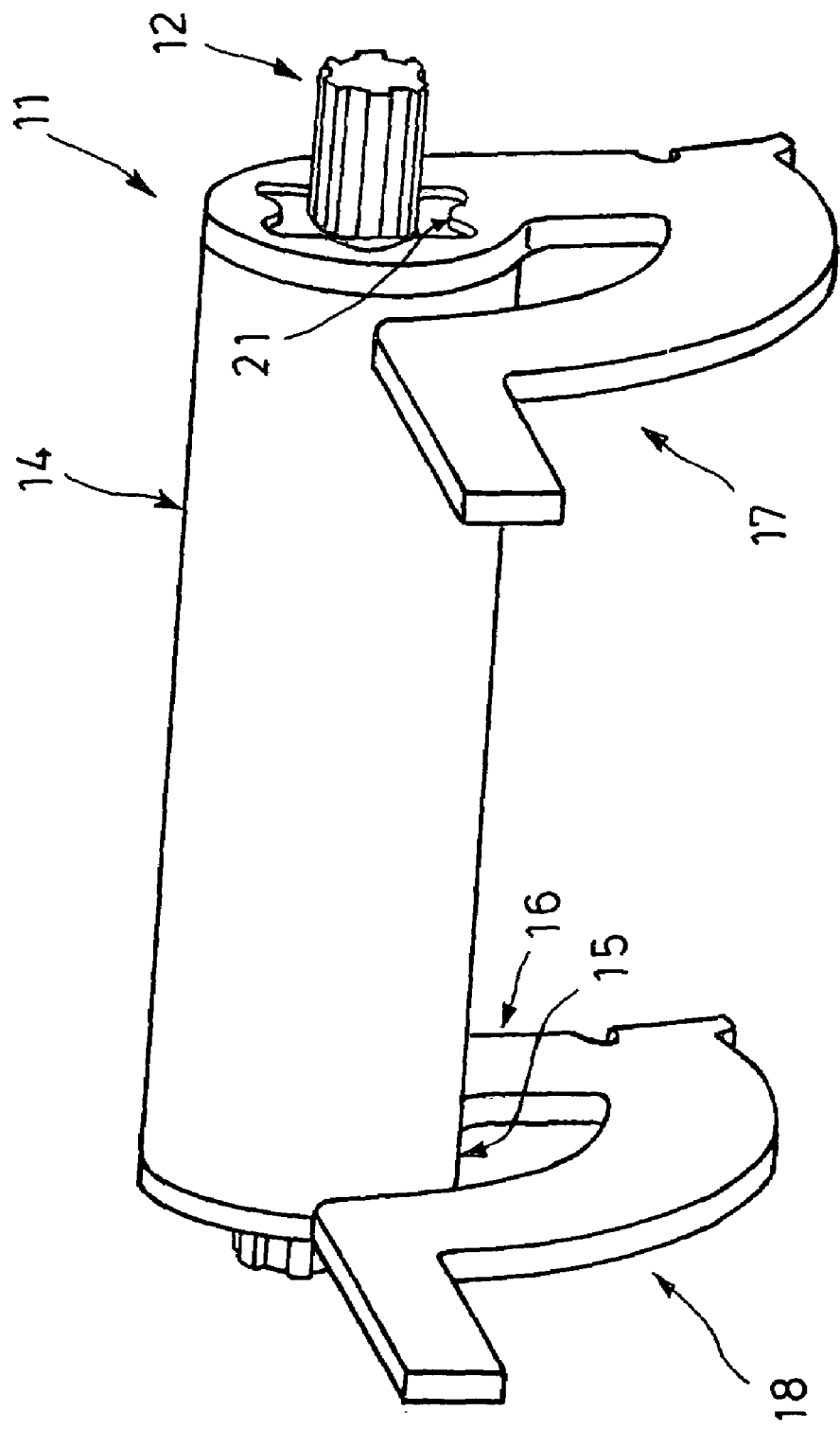
FIG. 11 is a perspective view of the elements of an alternate arm rest.

As shown in particular in FIG. 3, a hexagonal socket 21 of the support arm 17 fits over a hexagonal nut 22 formed integrally with a primary part P. As shown in FIGS. 11 and 13, instead of a hexagonal socket there is a Torx socket 21 and instead of the hexagonal nut there is a Torx formation 22 on the primary part P. Each end of the axle 12 carries a nonrotatable end part 58. The support arm 18 is rotationally supported by a sleeve 59 on the axle 12.

The primary part P as well as a control ring R, a secondary part S, an abutment W, a pusher D, a spring-washer pack T, and a setting nut E are mounted coaxially on the axle 12. The setting nut E or an equivalent part is not shown in FIGS. 11–13.

In order to axially fix the support arm 17, a snap ring 23 engages in an annular groove 24 of the axle 12.

The primary part P is shown in more detail in FIGS. 6–6B and 14–14B. The primary part P illustrated in FIGS. 6–6B and 14 corresponds to the embodiment of FIG. 3 and FIGS. 12 and 13, respectively. The primary part P has face teeth Z1 shaped like the Hirth teeth of a jaw clutch, so that the teeth each have a shallow slide flank facing in one direction and a steep or undercut blocking flank facing in the opposite direction. The teeth Z1 are arrayed in a continuous ring whose outer periphery is virtually level with the outer periphery of the primary part P so that the teeth Z1 have as a result of this formation considerable load-bearing capacity and thus are able to withstand relatively large angular loads.

The secondary part S has face teeth Z2 just like the teeth Z1 of the primary part P.

Figure 12:
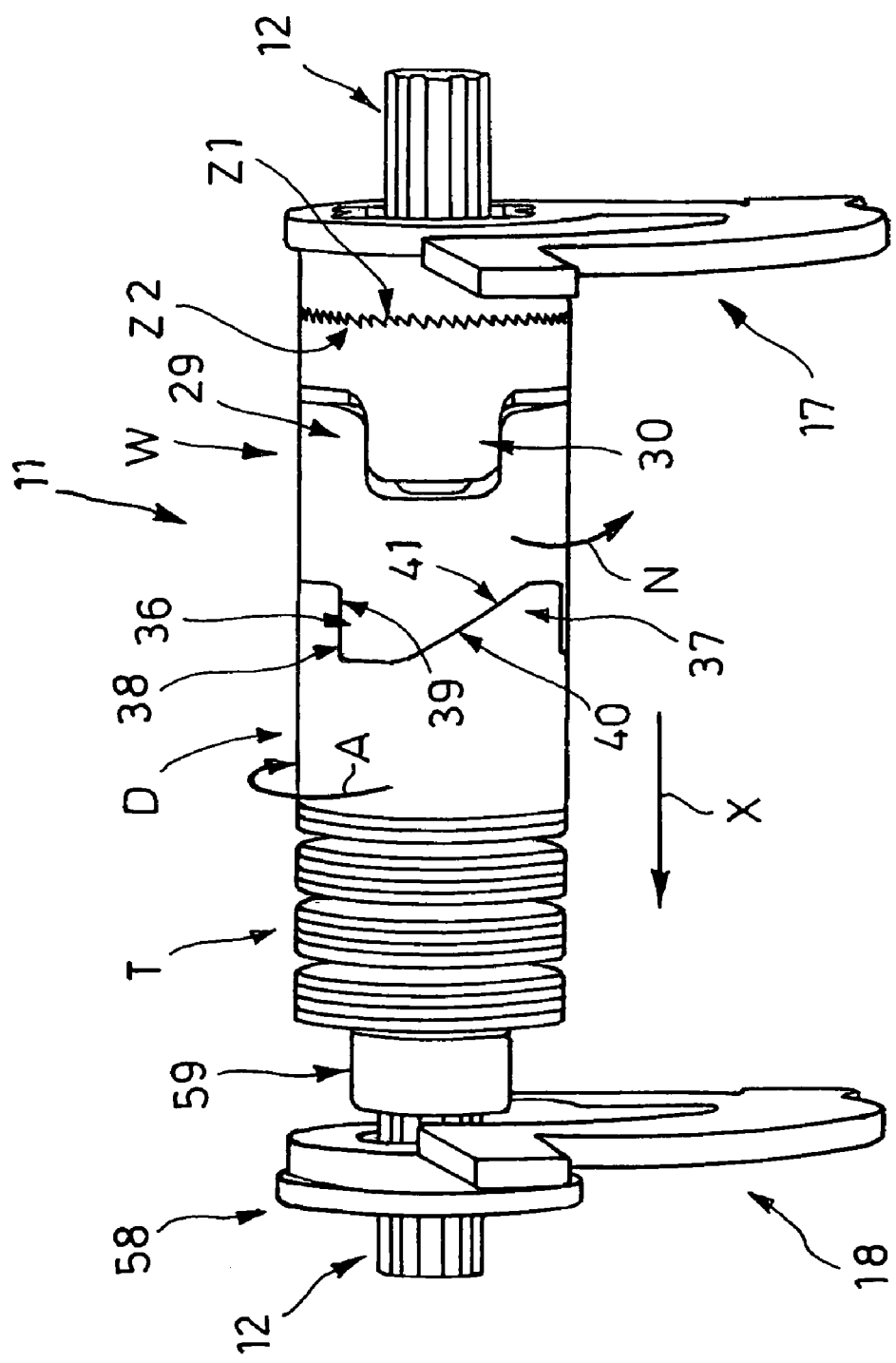
FIG. 12 is a view like FIG. 11 of the elements but without the outer tube shielding the inner parts.
Figure 14B:
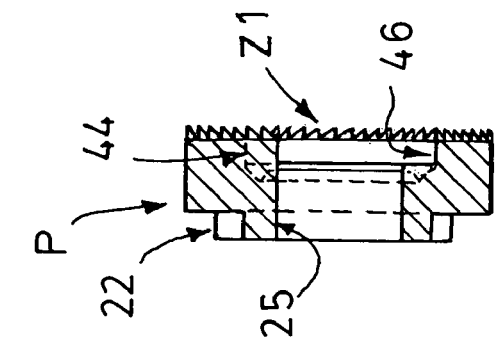
FIG. 14B is an axial section taken along line XIVB—XIVB of FIG. 14A.
Figure 14A:
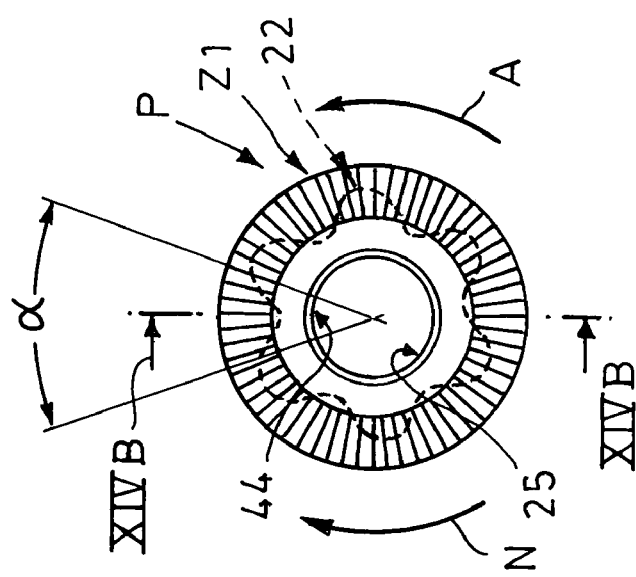
FIG. 14A is an end view of the primary part taken in the direction of arrow XIVA of FIG. 14.
Figure 14:
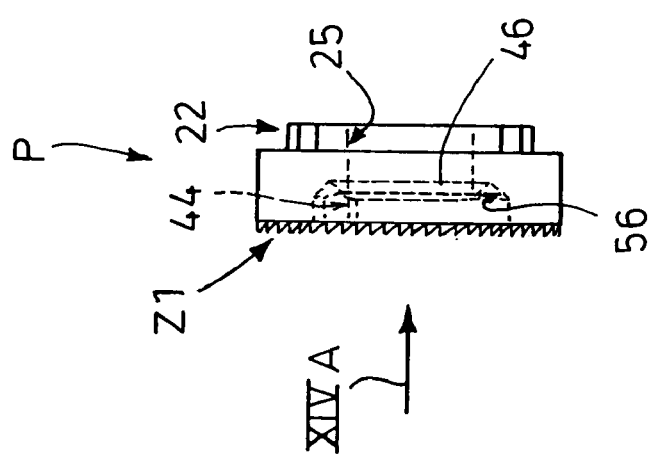
FIG. 14 is a side view of the primary part of the embodiment of FIGS. 12 and 13.

FIGS. 8–8D and 16–16D show the secondary part S in the embodiment of FIG. 3 and of FIGS. 12 and 13, respectively. The face teeth Z2 of the secondary part S are oriented relative to the face teeth Z1 of the primary part P such that when the support arm 17 swings upward as shown by arrow A (see FIGS. 3 and 13) the blocking flanks of the face teeth Z1 of the primary part P slide over the slide flanks of the face teeth Z2 of the secondary part S which normally is nonrotatable on the axle 12.

In case however the blocking flanks of the face teeth Z1 and Z2 bear angularly on each other and the force F (see FIGS. 3 and 13) is exerted downward on the arm support 20, downward-swing torque in the direction of arrow N is exerted on the face teeth Z1 of the primary part P. The result is that the blocking flanks of the nonrotatable secondary part S lock and downward pivoting is impossible in the downward rotation direction N.

As mentioned, the secondary part S normally cannot rotate on the axle 12, but is rotatably mounted with its smooth central hole 26 on the axle 12 like the primary part P with its smooth central bore 25. In case of an overload, the situation is different for the secondary part S as will be described in the following.

In the embodiment of FIGS. 3 and 13 the end face turned toward the primary part P of the secondary part S is juxtaposed with the abutment W that fits with a smooth central bore 27 over the axle 12 and is axially secured by a snap ring 28 (axial retaining ring) fitting in another radially outwardly open groove 24 on the axle 12.

The secondary part S and the abutment W are formed on their confronting end faces with respective axially projecting coupling claws 29 and 30 that serve to rotationally couple the axially shiftable secondary part S and the abutment W axially fixed on the axle 12.

Each coupling claw 29 and 30 and each recess 31 formed between adjacent coupling claws 29 of the secondary part S and claws 30 of the abutment W is formed with an axially open blind hole 33 in which can fit a respective one of four coil compression springs 34 extending parallel to the axle 12.

Instead of the four compression springs 34 a single coaxial compression spring (see 34 in FIG. 13) can be provided between the secondary part S and the abutment W, bearing on unillustrated annular shoulders of the respective outer surfaces of the secondary apart S and the abutment W.

The end face of the abutment W turned away from the secondary part S is juxtaposed with the pusher D. The pusher D (see FIGS. 10–10C) has an internal polygonal bore 35 that can slide axially but not rotate on a complementary square region 53 of the axle 12. In the embodiment of FIGS. 11–17A the pusher D (see FIGS. 17 and 17A) has instead of the polygonal bore a central hole 35 that is splined like the axle 12 so that the pusher D cannot rotate but can slide axially on the axle 12.

The abutment W and the pusher D have respective interengageable coupling projections 36 and 37 on their confronting end faces. The coupling-claw projections 36 of the abutment W have axially and radially extending faces 38 that bear on axially and radially extending faces 39 of the two coupling-claw projections 37 of the pusher D.

In addition the two coupling-claw projections 36 of the abutment W bear with faces 40 angled to the axle 12 on complementarily angled faces 41 of the two coupling-claw projections 37 of the pusher D.

The washer-spring pack T is provided at the end face of the pusher D turned away from the abutment W. The spring pack T biases the pusher D with a spring force against the abutment W which cannot move axially on the axle 12. The setting nut E (which is the same in FIGS. 12 and 13 but not shown) is carried on an external screwthread of the axle 12 so that the prestressing of the spring pack T can be set and adjusted.

Figure 15A:
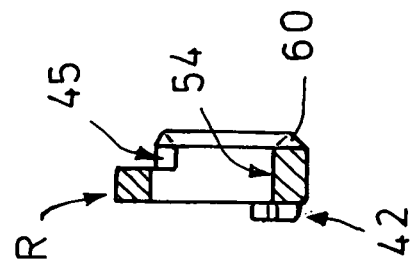
FIG. 15A is an axial section taken along line XVA—XVA of FIG. 15, FIG. 15A corresponding to the embodiment of FIGS. 12 and 13.
Figure 15:
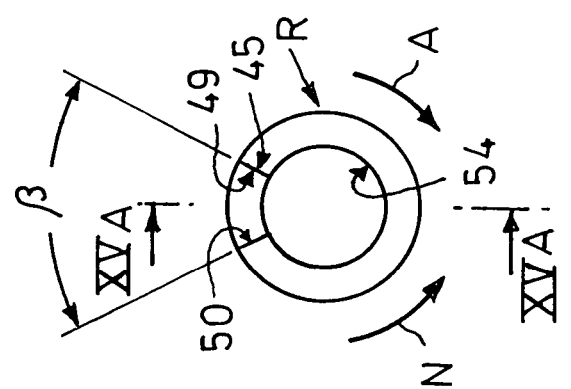
FIG. 15 is an end view of the control ring.
Figure 15B:
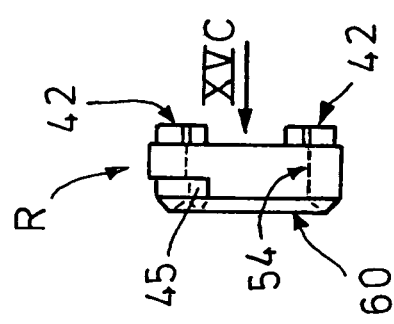
FIG. 15B is a side view of the control ring in a position offset by 180° to that of FIG. 15A.
Figure 15C:
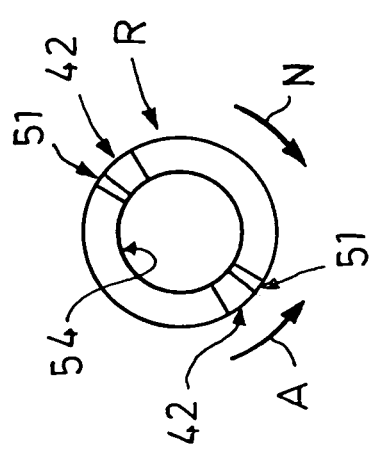
FIG. 15C is an end view taken in the direction of arrow XVC of FIG. 15B.
Figure 17:
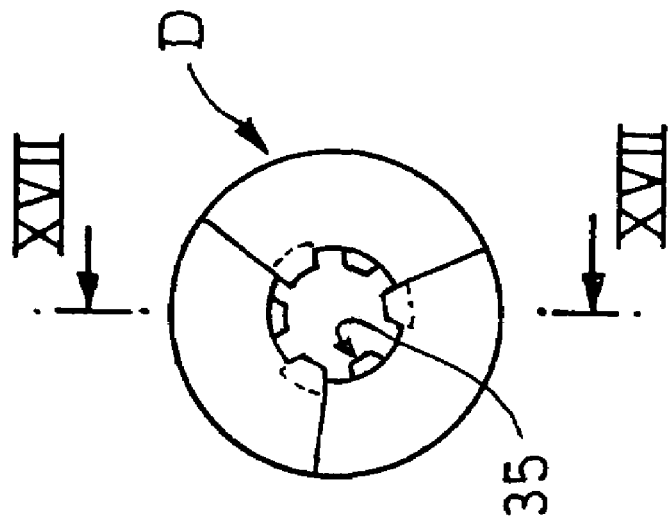
FIG. 17 is an end view taken in the direction of arrow XVII of FIG. 17A.
Figure 17A:
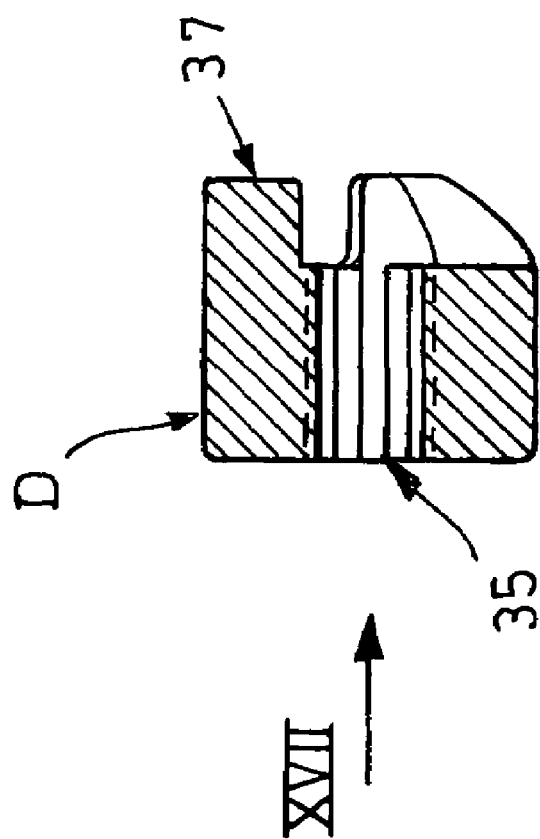
FIG. 17A is an axial section taken along line XVIIA—XVIIA of FIG. 17.

The control ring R mounted between the primary part P and the secondary part S and having a smooth central bore 54 through which passes the axle 12 fulfills a particular function, is rotationally coupled with the primary part P, and has on its end face turned toward the secondary part two control cam bumps 42 (see FIGS. 7–7C; FIGS. 15–15C) that coact with cam tracks 43 of the secondary part S.

The primary part P (see FIGS. 6–7B and FIGS. 14–14B) has a coupling bump 44 projecting toward the secondary part S and engaging in a coupling recess 45 open on the control ring R toward the primary part P.

The primary part P and the secondary part S have the end teeth Z1 and Z2 arrayed in circular rings. The outer periphery of each ring of teeth generally corresponds to the outer periphery of the body of the respective primary part P or secondary part.

Each set of face teeth Z1 and Z2 extends around the entire periphery of the respective primary part P or secondary part S.

The primary part P and the secondary part S are formed radially inward of the respective teeth Z1 and Z2 with generally cylindrical recesses 46 and 47. The cylindrical recesses 46 and 47 are open toward each other and thus form a cavity in which the control ring R is received. For certain applications it can be advantageous to provide more friction between the recess 46 of the primary part P and the corresponding surface of the control ring R than between the recess 47 of the secondary part and the other corresponding surface of the control ring R. To this end the recess 46 of the primary part P is formed with a circular V-shaped groove 56 and the control ring R with a complementary V-shaped ridge 60.

The coupling recess 45 of the control ring R extends over a greater angle β than the angle α of the coupling bump 44 of the primary part P. For example the angle β=60° and the angle α=45° so that the coupling bump 44 has about 15° of play.

The two cam bumps 42 of the control ring R are engageable in respective cam recesses 48 of the cam tracks 43 of the secondary part S. The cam tracks 43 form annular surfaces centered on the axle 12 at the base of the cylindrical recess 47 of the control ring R.

The arm rest shown in the drawing functions as follows:

When the arm-rest support 17 is in its lowermost position, the coupling bump 44 bears on a second abutment face 50 of the coupling recess 45 of the control ring R. Since the angle β of the coupling recess 45 is for example 15° larger than the angle α of the coupling bump 44, the primary part P fixed rotationally to the arm-rest body 17 has about 15° of play. The arm-rest body can ratchet over for example four teeth of the rotationally fixed face teeth Z2 of the secondary part while moving through this play.

Immediate downward movement out of one of these four positions is not possible, because the teeth Z1 and Z2 are locked together.

A limited upward pivoting of 15° is nonetheless possible, because the blocking flanks of the teeth Z1 of the primary part P can slip unhindered over the slide flanks over the nonrotatable teeth Z2 of the secondary part S.

In this manner it is possible to shift the arm-rest body 17 upward into an upright position, but the ratcheting sound made by the teeth Z1 and Z2 is somewhat bothersome. In order to eliminate this noise, the invention works as follows:

As soon as the coupling bump 44 comes into contact against a first abutment face 49 of the coupling recess 45 of the control ring R and the upward movement continues in rotation direction A, the two cam bumps 42 engage with angled faces 51 on angled faces 52 of the secondary-part cam recesses 48 and rise therefrom as indicated at A in FIGS. 7, 7C, and 8D and in FIGS. 15, 15C, and 16D.

In this manner the secondary part S is shifted back away from the primary part P against the force of the springs 34 so that the teeth Z1 and Z2 disengage from each other and the support arm 17 can be swung silently into its upright position. During this upward movement the two cam bumps 42 slide on the flat cam tracks 43.

If now, starting from the upright position of the arm-rest body 17, a downward pivoting is initiated, the coupling bump 44 moves in the angular direction N from the first abutment face 49 back into the above-described starting position against the abutment face 50.

Thus the cam bumps 42 move again over the flat cam tracks 43 backward in angular direction N (see FIGS. 7C and 8D as well as FIGS. 15C and 16D) and finally slide back again into the cam recesses 48 of the secondary-part cam tracks 43, whereupon the arm-rest body 17 finds itself again in its above-described lowermost starting position and the face teeth Z1 and Z2 are again in mesh with each other.

In order to insure that in every case when downwardly pivoting in the angular direction N the coupling bump 44 moves from the first abutment face back into the above-described position on the abutment face 15 so that a subsequent adjustment upward in direction A ensures a shift of 15°, the invention provides the following as shown in the embodiment of FIGS. 11–17A:

Control bumps 55 project from the flat cam tracks 43 in an axial direction x toward the control ring R immediately adjacent in the upward rotation direction A from each secondary-part cam recess 48.

As soon as the coupling bump 44 engages against the first abutment face 49 of the cam recess 45 of the control ring R and upward pivoting continues in angular direction A, the two cam bumps 42 slide with their angled flanks 51 over the angled flanks 52 of the secondary-part cam recesses 48 and rise out of them and then, as shown in FIG. 16D, come into engagement with the control bumps 55 and slide over them. This pushes the secondary part S against the spring force, that is against the force of the single coil spring 34, away from the primary part P so that the face teeth Z1 and Z2 disengage from each other and the support arm 17 can move silently into its upright position. During this upward pivoting in the direction A the two cam bumps 42 slide over the flat cam tracks 43. When however, starting in the completely raised position of the support arm 17, which is defined by an external abutment, downward pivoting in the direction N is initiated, the coupling bump 44 moves in the direction N from the first abutment face 49 back into its above-described starting position against the abutment face 50. In order that this reverse rotation can take place, there must be some relative movement between the primary part P and the control ring R, which is made possible by friction in the embodiment of FIGS. 1–10C so as to hold back the control ring R relative to the secondary-part cam tracks 43. This holding back is done however according to FIG. 16D by the control bump 55 because the cam bump 42, when moving downward in the direction N, moves against a face 57 of the control bump 55 and thus ensures engagement of the primary-part coupling bump 44 against the second abutment face 50 of the control ring R.

For the situation when the arm-rest body 17 is in its lowermost position and an overload is applied in direction F to the arm-rest body 17 so as to press the arm-rest body 17 downward in pivot direction N, the teeth Z1 and Z2 are locked together.

The rotary coupling by means of the coupling claws 29 and 30 of the secondary part S and the abutment W transmits overload torque to the abutment so that the abutment W rotates in direction N (see FIGS. 2 and 12) and the angled slide faces 40 of the coupling-claw projections 36 of the abutment W act on the angled slide faces 41 of the coupling-claw projections 37 of the pusher D in axial direction x. In this manner in case of an overload in rotation direction N, the abutment W can rotate relative to the pusher D and deflect so as to unload the arm rest 10.

The invention claimed is:

1. A vehicular arm rest comprising:
   a fixed axle extending along an axis;
   a primary part rotatable about the axis on the axle, axially fixed on the axle, and formed with an array of axially directed primary-part teeth;
   an arm-rest body fixed to the primary part and pivotable therewith about the axis in an downward direction between a raised position and a lowered position and in an opposite upward direction between the lowered position and the raised position;
   a secondary part at most limitedly pivotal about the axis on the axle, axially shiftable on the axle, and having an array of axially directed secondary-part teeth meshable with the primary-part teeth, the teeth of both parts being angled such that when meshed the primary-part and secondary-part teeth inhibit movement of the arm-rest body in the downward direction between the raised position and the lowered position but permit movement of the arm-rest body in the upward direction between the lowered position and the raised position;
   an abutment axially fixed on the axle with the secondary part between the abutment and the primary part;
   a spring assembly braced axially between the abutment and the secondary part and urging the secondary-part teeth into mesh with the primary-part teeth; and
   a controller including
      a control ring between the primary part and the secondary part and having a control-ring cam side turned toward one of the parts and a control-ring coupling side turned toward the other of the parts, the one part having a cam side turned toward the control-ring cam side and the other part having a coupling side turned toward the control-ring coupling side,
      cam formations on the cam sides,
      a coupling bump on one of the coupling sides and projecting toward the other of the coupling sides,
      a coupling recess on the other of the coupling sides open toward the one coupling side and receiving the coupling bump
   for pushing the secondary part away from the primary part on pivoting of the primary part in the downward direction from the raised position of the arm-rest body toward the lowered position for decoupling the primary-part teeth from the secondary-part teeth and for coupling the primary-part teeth with the secondary-part teeth and preventing further movement in the downward direction on reaching the lowered position.

2. The vehicular arm rest defined in claim 1 wherein each of the arrays of teeth is substantially circular and both of the parts are formed radially inward of the respective arrays with generally cylindrical recesses open toward each other and forming a cavity holding the control ring.

3. The vehicular arm rest defined in claim 2 wherein the coupling bump has a predetermined angular dimension and the coupling recess has a predetermined angular dimension greater than that of the coupling bump, whereby the coupling bump can move angularly within the coupling recess permitting limited relative angular movement between the control ring and the other part.

4. The vehicular arm rest defined in claim 1 wherein the cams each have a respective face and the cam formations include:
   an annular cam track on one of the cam faces;
   a cam recess in the track on the one cam face and open toward the other cam face;
   a cam bump formed on the other cam face, projecting axially toward the one cam face, and riding on the cam track,
the cam bump, cam track, and cam recess being constructed such that when the cam bump is riding on the cam track the primary-part teeth are held out of mesh with the secondary-part teeth and when the cam bump is engaged in the cam recess the primary-part teeth mesh with the secondary-part teeth.

5. The vehicular arm rest defined in claim 4 wherein the track is generally circular, planar and perpendicular to the axis.

6. The vehicular arm rest defined in claim 4 wherein the controller shifts the cam bump out of the cam recess on pivoting toward the raised position, also shifts the cam bump out of the cam recess on pivoting out of the raised position toward the lowered position, but positions the cam bump in the recess on pivoting toward the lowered position from any position between the raised and lowered positions.

7. The vehicular arm rest defined in claim 4 wherein the track is formed offset from the recess with a ridge, the cam bump riding over the ridge on displacement of the arm-rest body from the raised position to the lowered position.

8. The vehicular arm rest defined in claim 7 wherein the ridge is immediately adjacent the cam recess.

9. The vehicular arm rest defined in claim 1 wherein the spring assembly includes a single compression spring surrounding the axis and bearing axially on the abutment and on the secondary part.

10. A vehicular arm rest comprising:
a fixed axle extending alone an axis;
a primary part rotatable about the axis on the axle, axially fixed on the axle, and formed with an array of axially directed primary-part teeth;
an arm-rest body fixed to the primary part and pivotable therewith about the axis in an downward direction between a raised position and a lowered position and in an opposite upward direction between the lowered position and the raised position;
a secondary part at most limitedly pivotal about the axis on the axle, axially shiftable on the axle, and having an array of axially directed secondary-part teeth meshable with the primary-part teeth, the teeth of both parts being angled such that when meshed the primary-part and secondary-part teeth inhibit movement of the arm-rest body in the downward direction between the raised position and the lowered position but permit movement of the arm-rest body in the upward direction between the lowered position and the raised position;
an abutment axially fixed on the axle with the secondary part between the abutment and the primary part;
a spring assembly braced axially between the abutment and the secondary part and urging the secondary-part teeth into mesh with the primary-part teeth;
a controller between the primary part and the secondary part and including cam formations and means for
pushing the secondary part away from the primary part on pivoting of the primary part in the downward direction from the raised position of the arm-rest body toward the lowered position for decoupling the primary-part teeth from the secondary-part teeth and for
coupling the primary-part teeth with the secondary-part teeth and preventing further movement in the downward direction on reaching the lowered position; and
formations rotationally coupling the abutment to the secondary part.

11. The vehicular arm rest defined in claim 10 wherein the formations coupling the abutment to the secondary part include a plurality of axially extending coupling teeth on the abutment and on the secondary part having faces extending parallel to the axis and bearing angularly on each other.

12. The vehicular arm rest defined in claim 11 wherein the abutment and secondary part are formed between the respective coupling teeth with recesses, the coupling teeth of the abutment fitting in the recesses of the secondary part and the coupling teeth of the secondary part fitting in the recesses of the abutment, the coupling teeth and recesses being formed with axially aligned blind bores, the spring assembly including respective compression springs in the axially aligned blind bores.

13. A vehicular arm rest comprising:
a fixed axle extending along an axis;
a primary part rotatable about the axis on the axle, axially fixed on the axle, and formed with an array of axially directed primary-part teeth;
an arm-rest body fixed to the primary part and pivotable therewith about the axis in an downward direction between a raised position and a lowered position and in an opposite upward direction between the lowered position and the raised position;
a secondary part at most limitedly pivotal about the axis on the axle, axially shiftable on the axle, and having an array of axially directed secondary-part teeth meshable with the primary-part teeth, the teeth of both parts being angled such that when meshed the primary-part and secondary-part teeth inhibit movement of the arm-rest body in the downward direction between the raised position and the lowered position but permit movement of the arm-rest body in the upward direction between the lowered position and the raised position;
an abutment axially fixed on the axle with the secondary part between the abutment and the primary part;
a spring assembly braced axially between the abutment and the secondary part and urging the secondary-part teeth into mesh with the primary-part teeth; and
a controller between the primary part and the secondary part and including cam formations and means for
pushing the secondary part away from the primary part on pivoting of the primary part in the downward direction from the raised position of the arm-rest body toward the lowered position for decoupling the primary-part teeth from the secondary-part teeth and for
coupling the primary-part teeth with the secondary-part teeth and preventing further movement in the downward direction on reaching the lowered position; and
an overload protector including means connected to the abutment for permitting the abutment to pivot on the axis with the secondary part when the arm-rest body is pressed toward the lowered position with a force exceeding a predetermined limit.

14. The vehicular arm rest defined in claim 13 wherein the overload protector includes
a pusher rotationally fixed and axially shiftable on the axle, the abutment lying between the pusher and the secondary part;
coupling projections on the pusher and on the abutment extending toward each other and having mutually engaging faces lying in planes extending at an acute angle to the axis; and
a spring pressing the pusher axially toward the abutment, the mutually engaging faces being angled and the spring having a force such that, when the arm-rest body is pressed toward the lowered position with a force exceeding a predetermined limit, the mutually engaging faces cam the pusher axially away from the abutment and permit limited rotation of the abutment and secondary part on the axle.

15. The vehicular arm rest defined in claim 14 wherein the axle has a nonround portion and the pusher has complementarily nonround bore fitted over the nonround portion.

16. The vehicular arm rest defined in claim 14 wherein the spring is a pack of spring washers.

17. The vehicular arm rest defined in claim 14, further comprising
a shield tube surrounding the pusher, the abutment, the secondary part, the primary part, and the spring.

18. The vehicular arm rest defined in claim 17 wherein the arm-rest body includes a pair of arms extending radially from the axle, one of the arms being fixed to the primary part, the shield tube having formations coupling both of the arms rotationally together.

19. The vehicular arm rest defined in claim 14 wherein the axle is splined along its entire length, the pusher being splined to the axle, the abutment, secondary part, and primary part having smooth bores through which the axle passes.

* * * * *